Figure 1:
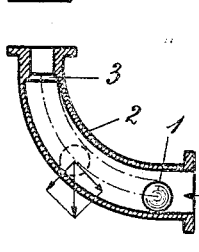

P. SPALECK.
GAS CONSUMPTION REGULATOR.
APPLICATION FILED MAY 19, 1914.

1,243,454.

Patented Oct. 16, 1917.
2 SHEETS—SHEET 1.

Witnesses:

Inventor:
Paul Spaleck

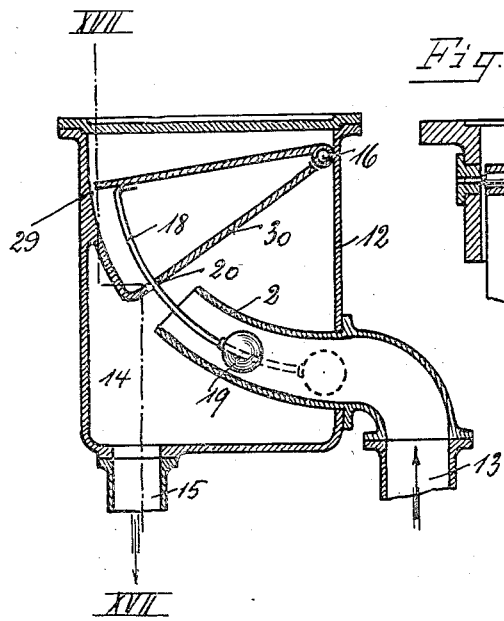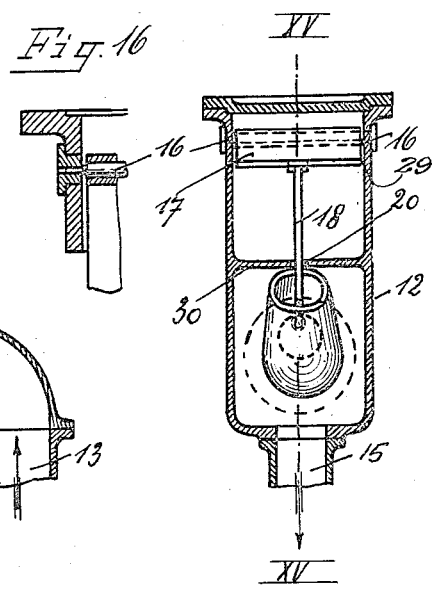

UNITED STATES PATENT OFFICE.

PAUL SPALECK, OF DESSAU, GERMANY, ASSIGNOR TO HUGO JUNKERS, OF AACHEN, GERMANY.

GAS-CONSUMPTION REGULATOR.

1,243,454.  Specification of Letters Patent.  Patented Oct. 16, 1917.

Application filed May 19, 1914. Serial No. 839,653.

*To all whom it may concern:*

Be it known that I, PAUL SPALECK, a subject of the German Emperor, residing at Dessau, Firm Junkers & Co., Cöthenerstrasse, in the Empire of Germany, have invented certain new and useful Improvements in Gas-Consumption Regulators, of which the following is a specification.

This invention relates to devices for regulating the consumption of gas, particularly to those for use with apparatus for heating liquids.

Gas-consumption regulators for maintaining the same quantity of gas used by burners for lighting, cooking and heating purposes are known such that when the pressure of the gas rises the resistance offered by the regulating member, generally a diskvalve or a ball-valve, is increased owing to a spring, which coacts with the disk or ball, being compressed or expanded thereby constricting the passage through which the gas flows.

Such gas-consumption regulators in which the regulating member is influenced by a spring have the disadvantage that the spring can be adapted only with very great difficulty to the requirements of the regulator, particularly as regards variation of gas-pressure and constant good regulation. This is due, on the one hand, to the springs in such regulators frequently possessing different elasticity, and, on the other hand, to the increase in the elasticity of the spring not always varying in such manner, when being compressed or expanded, that the quantity of gas remains constant. Moreover, the tension of the spring changes in the course of time, particularly under the influence of the heat of the burner. In addition, sliding friction is generally met with in such regulators, whereby their accuracy is impaired.

A primary object of my invention is to obviate these defects. To this end, I provide that when the gas pressure increases the increasing resistance of the throttling member is produced by employing as throttling member a ball, roller or the like which moves in a pipe of any desired cross-section which is suitably curved upward and tapers in the direction of flow of the gas, the arrangement being such that that component of the weight of the throttling member which opposes the gas pressure and is due to the angle of inclination of the curved track of the throttling member increases corresponding to the gas pressure, while the cross-section which is left free between the throttling member and pipe decreases in such a ratio that always the same quantity of gas flows through the regulator. The path of the throttling member may be circular or elliptical or according to any other suitable curve. It is only essential that the resistance shall increase when the gas pressure is higher, the cross-section of passage being constricted in such a manner that always only the same quantity of gas can pass to the burner.

A throttling member a ball or the like rolling in a rising curved conduit or pipe is preferably employed. As all sliding friction is avoided by employing such a rolling ball or the like the accuracy of adjustment is very great and the danger of sticking owing to dirt or moisture is greatly diminished.

In another form of my invention the friction of the throttling member, ball, roller or the like is diminished still more. To this end, the throttling member does not run along the bottom of the pipe, but is freely suspended like a pendulum, the upwardly tapering pipe running in a circle whose center is approximately the point of suspension. Also in this case the cross-section of passage is constricted when the pressure of the gas increases, while the component force opposing the gas pressure is correspondingly increased. Under these circumstances it is not necessary for the throttling member to have the form of a ball or roller, but it may have any desired shape, *e. g.* that of a disk. Preferably the suspension device is provided with a suitable device for damping the oscillations of the throttling member. Further when this pendulum-like suspension is employed the disk constituting the throttling member may extend the entire length of the pendulum and be formed as a valve disk such that it occupies the entire cross-section of the casing of the regulator.

Another object of my invention is to provide that an improved regulator of the type described can be adjusted according to the calorific value or to the specific gravity of the gas in question. This can be effected, for example, by varying the inclination of the pipe when a ball or roller is employed as the throttling member. When the throttling member is suspended to oscillate freely, weights adjustable relatively to the axis of oscillation may be arranged on these throttling members, and in all cases the throttling members can be readily exchanged. Further, I may arrange a by-pass connected to the main gas pipe and may adjust the section of passage through the same.

To these ends, my invention consists in the construction, arrangement and combination of parts described hereinafter and pointed out in the claims.

Several illustrative embodiments of my invention are represented by way of example in the accompanying drawings, wherein:—

Figure 2:
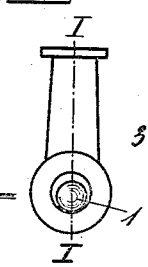
Figure 3:
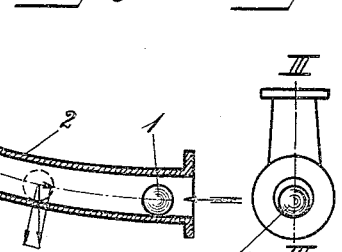
Figure 4:
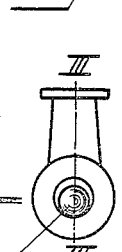
Figure 5:
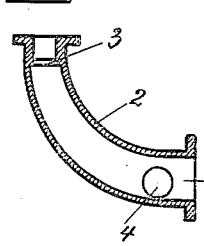
Figure 6:
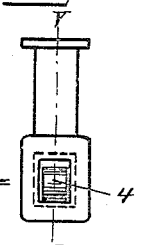

Figure 1 is a transverse section of a device embodying the invention, the section being on line I—I of Fig. 2; Fig. 2 is an end elevation of the device shown in Fig. 1; Fig. 3 is a sectional view similar to Fig. 1 and in section on line III—III of Fig. 4 illustrating a modified construction; Fig. 4 is a view corresponding to Fig. 2 and illustrating the modified construction shown in Fig. 3; Fig. 5 is a sectional view corresponding to Fig. 1 and illustrating a further modification, the section being on line V—V of Fig. 6; Fig. 6 is an elevation of the modified construction shown in Fig. 5; Figs. 7, 8, 9 and 10 are elevations corresponding to Figs. 2, 4 and 6 and illustrating further modifications; Figs. 11, 12, 13 and 14 are sectional views illustrating modified forms in which the invention may be embodied; Fig. 15 is a vertical section of a further modified form of regulator embodying the invention, the section being on line XV—XV of Fig. 17; Fig. 16 is a sectional detail view of certain of the parts shown in Fig. 15; and Fig. 17 is a transverse section on line XVII—XVII of Fig. 15.

Referring firstly to Figs. 1 to 4, a ball 1 runs in a curved pipe of circular section which rises and tapers in the direction of flow of the gas, the arrangement being such that that component of the weight of the ball which opposes the pressure of the gas and is caused by the angle of inclination of the curved ball-race increases corresponding to the gas pressure, while the free cross-sectional area between the ball 1 and the pipe 2 decreases in such a ratio that the same quantity of gas consumption always flows through the regulator. In order that the ball 1 can not become jammed in the gradually tapering pipe 2 the latter is provided with a shoulder or stop 3 at a part of the pipe where its cross-section is still somewhat larger than the section of the ball.

In the embodiment shown in Figs. 3 and 4 the ball-race is a part of an ellipse. By making this ellipse or similar curve as flat as possible the sensitiveness of the regulator can be very greatly increased.

In contradistinction to the embodiments shown in Figs. 1 to 4, in which a ball constitutes the throttling member, in the embodiments shown in Figs. 5 and 6 a roller 4 is employed.

Figure 7:
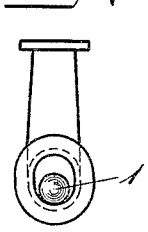
Figure 8:
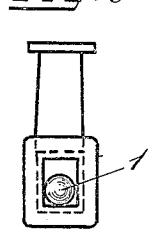

Figs. 7 to 10 show regulators comprising pipes of various section, that in Fig. 7 being elliptical and that in Fig. 8 rectangular, these pipes tapering and being directed upward as described above.

Figure 9:
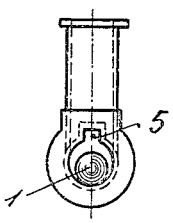
Figure 10:
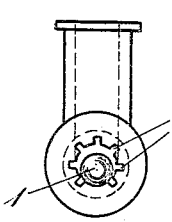

In the form shown in Figs. 9 and 10 the arrangement is such that the main channel in the pipe possesses a somewhat larger cross-section than the ball, but it is constant throughout its length. The constriction of the cross-section of the pipe is produced by providing one or more auxiliary channels 5 or 6 whose cross-section gradually decreases. Instead of several channels whose cross-section gradually decreases, if desired the arrangement may be such that the number of channels according to Fig. 10 gradually decreases.

Figure 11:
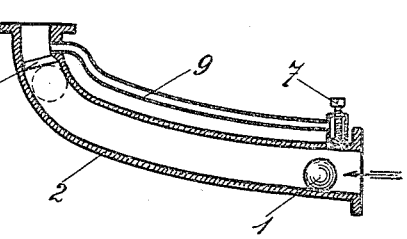

Fig. 11 shows an embodiment which can be adjusted according to the calorific value or to the specific gravity of the kind of gas to be used. For this purpose a by-pass 9 the flow through which can be varied by means of a needle valve 7 leads from the space in front of the ball 1 when it occupies its lowest position to the space behind the ball when it occupies its highest position. The regulator can be adapted to the kind of gas by varying the weight of the ball or by employing a larger or smaller ball.

Figure 12:
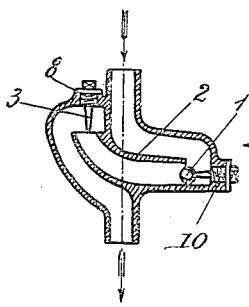
Figure 13:
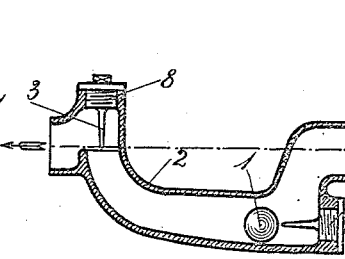
Figure 14:
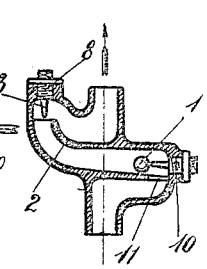

The embodiments in Figs. 12 to 14 represent regulators for vertical or horizontal gas flow. The tapering upwardly-directed pipe or conduit 2 in which the ball 1 rolls is disposed in such manner that the direction of admission of the gas is in alinement with the direction of the outlet, in order that the regulator can be readily connected into any vertical or horizontal pipe. 8 and 10 designate two set-screws; the screw 10 enables the ball to be removed from the pipe 2. In the embodiment shown in Fig. 14 the ball 1 can be readily removed and the admission pipe is covered over by a perforated wall 11.

In the embodiment shown in Figs. 15 to 17 the upwardly tapering pipe 2 having the form of the arc of a circle is arranged projecting into a casing 12 through which the gas flows from the inlet 13 into the interior 14 of the casing and issues through the outlet 15. The throttling member 19 is suspended to swing freely like a pendulum about the axis 16—16, which approximately passes through the center of the circle of which the pipe 2 forms a part so that it can move approximately along the axis of the tapering pipe 2. The pendulum-like suspension is effected by means of a rod or plate 17 and an arm 18 whose one end is attached to the plate 17, while its other end carries the throttling member 19. The plate 17 may serve at the same time to damp the oscillations of the member 19, for which purpose it is accommodated in a casing 30 in which it can move with only a small clearance between it and the walls of the casing. In order to improve the damping action the arm 18 is bent to the arc of a circle having the center 16, so that only a small hole 20 is required for the arm 18 to pass through the part 30. Accordingly the plate 17, the arm 18 and the throttling member 19 oscillate perfectly freely, apart from the immaterial amount of friction of the pivots. The oscillatory motion of the throttling member 19 is damped owing to the gas above and below the plate 17 being alternately compressed and rarefied when the plate moves upward and downward, the difference in pressure between the two sides of the plate slowly disappearing by way of the space 29. Obviously there is no need for the throttling member 19 to move exactly along the central line of the pipe 2; if desired it may move parallel to the lower or upper wall of the pipe. In all cases the regulator must be so constructed, however, that the only friction in the device is the sliding friction of the pivots at the axis 16. It is not necessary for the throttling member to be a ball or the like; it may be a disk, plate, cone or the like if desired.

I claim:—

1. A device for regulating the consumption of gas, comprising the combination of a conduit which is curved in the direction of its length, which is tapered in cross-section from its inlet end toward its outlet end and which is mounted in an upright position with its outlet end higher than its inlet end, and a throttling member movable freely in the conduit without sliding friction and tending always to move by gravity toward the lower inlet end, whereby the quantity of gas passing through the conduit remains substantially constant as the pressure of the gas varies.

2. A device for regulating the consumption of gas, comprising in combination an upwardly-directed conduit which is curved in the direction of its length and whose cross-section gradually decreases toward the upper, outlet end thereof, and a throttling member movable freely in said conduit without sliding friction and normally located under the action of gravity at the lower, inlet end of the conduit, the arrangement being such that that component of the weight of the throttling member which opposes the flow of gas through the conduit increases corresponding to the pressure of the gas, while the cross-section of the passage left free between the throttling member and the conduit decreases in such a ratio that always the same quantity of gas issues from the conduit.

3. A device for regulating the consumption of gas, comprising the combination of a conduit which is curved in the direction of its length, which is tapered in cross-section from its inlet end toward its outlet end, and which is mounted in an upright position with its outlet end higher than its inlet end, and a throttling member movable freely in the conduit without sliding friction in a path curved about the axis of curvature of the conduit, the throttling member being actuated by gravity to move toward the lower inlet end of the conduit.

4. A device for regulating the consumption of gas, comprising the combination of a conduit which is curved in the direction of its length and mounted in an upright position with its outlet end higher than its inlet end, said conduit consisting of a main channel which is of uniform cross-section throughout and an auxiliary channel communicating throughout its length with the main channel and of gradually decreasing cross-section from the inlet end of the conduit toward the outlet end, and a throttling member movable within the conduit without sliding friction and actuated by gravity to move toward the inlet end of the conduit.

5. A device for regulating the consumption of gas, comprising in combination an upwardly-directed conduit whose cross-section gradually decreases toward the upper, outlet end thereof, and a throttling member freely suspended at a point outside the conduit and movable freely in the conduit without sliding friction and normally located under the action of gravity at the lower, inlet end of the conduit, the arrangement being such that that component of the weight of the throttling member which opposes the flow of gas through the conduit increases corresponding to the pressure of the gas, while the cross-section of the passage left free between the throttling member and the conduit decreases in such a ratio that always the same quantity of gas issues from the conduit.

6. A device for regulating the consumption of gas, comprising in combination an upwardly-directed conduit whose cross-section gradually decreases toward the upper, outlet end thereof, and a throttling member rotatable about an axis exterior to the conduit and movable freely in said conduit without sliding friction and normally located under the action of gravity at the lower, inlet end of the conduit, for causing an approximately equal quantity of gas to issue from the conduit when the pressure of the gas varies.

7. A device for regulating the consumption of gas, comprising in combination an upwardly-directed conduit whose cross-section gradually decreases toward the upper, outlet end thereof, said conduit comprising at least one channel of constant cross-section and at least one channel of upwardly decreasing cross-section connected its entire length with the former channel, and a throttling member movable freely in said conduit without sliding friction and normally located under the action of gravity at the lower, inlet end of the conduit, the arrangement being such that that component of the weight of the throttling member which opposes the flow of gas through the conduit increases corresponding to the pressure of the gas, while the cross-section of the passage left free between the throttling member and the conduit decreases in such a ratio that always the same quantity of gas issues from the conduit.

8. A device for regulating the consumption of gas, comprising in combination an upwardly-directed conduit whose cross-section gradually decreases toward the upper, outlet end thereof, and a pivotally mounted spherical throttling member movable freely along the central longitudinal axis of said conduit without sliding friction and normally located under the action of gravity at the lower, inlet end of the conduit, for causing an approximately equal quantity of gas to issue from the conduit when the pressure of the gas varies.

9. A device for regulating the consumption of gas, comprising in combination an upwardly-directed conduit whose cross-section gradually decreases toward the upper, outlet end thereof, and a throttling member movable freely in said conduit without sliding friction and normally located under the action of gravity at the lower, inlet end of the conduit, and means for damping the movements of the throttling member.

10. A device for regulating the consumption of gas, comprising in combination an upwardly-directed conduit whose cross-section gradually decreases toward the upper, outlet end thereof, and a throttling member movable freely in said conduit without sliding friction and normally located under the action of gravity at the lower, inlet end of the conduit, and means for damping the throttling member, said means comprising a casing and a plate mounted to oscillate in the casing and carrying the throttling member.

11. A device for regulating the consumption of gas, comprising the combination of a conduit which is curved in the direction of its length, which is tapered in cross-section from its inlet end toward its outlet end and which is mounted in an upright position with its outlet end higher than its inlet end, a throttling member movable in the conduit without sliding friction, and a damping member located outside the conduit and connected to the throttling member to dampen the movements of the throttling member within the conduit.

In testimony whereof I affix my signature in presence of two witnesses.

PAUL SPALECK.

Witnesses:
RUDOLPH FRICKE,
ALICE DUNGER.